G. W. RATHFON.
MARKER FOR BRICKMAKING MACHINES.
APPLICATION FILED JUNE 30, 1909.

1,004,818.

Patented Oct. 3, 1911.
2 SHEETS—SHEET 1.

G. W. RATHFON.
MARKER FOR BRICKMAKING MACHINES.
APPLICATION FILED JUNE 30, 1909.

1,004,818.

Patented Oct. 3, 1911.

2 SHEETS—SHEET 2.

Witnesses

Inventor
George W. Rathfon.

By

Attorneys

UNITED STATES PATENT OFFICE.

GEORGE W. RATHFON, OF BRAZIL, INDIANA.

MARKER FOR BRICKMAKING-MACHINES.

1,004,818.   Specification of Letters Patent.   Patented Oct. 3, 1911.

Application filed June 30, 1909. Serial No. 505,295.

*To all whom it may concern:*

Be it known that I, GEORGE W. RATHFON, citizen of the United States, residing at Brazil, in the county of Clay and State of Indiana, have invented certain new and useful Improvements in Markers for Brickmaking-Machines, of which the following is a specification.

This invention relates to brick molding machines and refers particularly to an attachment whereby the surfaces of the molded articles are roughened or otherwise demarked to give a fanciful appearance to the same.

An object of this invention is to provide an attachment to a practical molding machine whereby the plastic block which is fed upon the mold to the cutter is brought into engagement with the improved device to indent the surfaces thereof in order to form fanciful configurations upon the same.

The invention has for another object the provision of an improved mechanism which is adaptable to a mold for engaging the plastic blocks as they are fed to the molds and which operates in conjunction with the feeding mechanism of the mold.

The invention further contemplates a marker of this character which is adaptable to molds of various types and which may be detached from the same when not desired.

For a full understanding of the invention reference is to be had to the following description and accompanying drawings, in which:—

Figure 1:
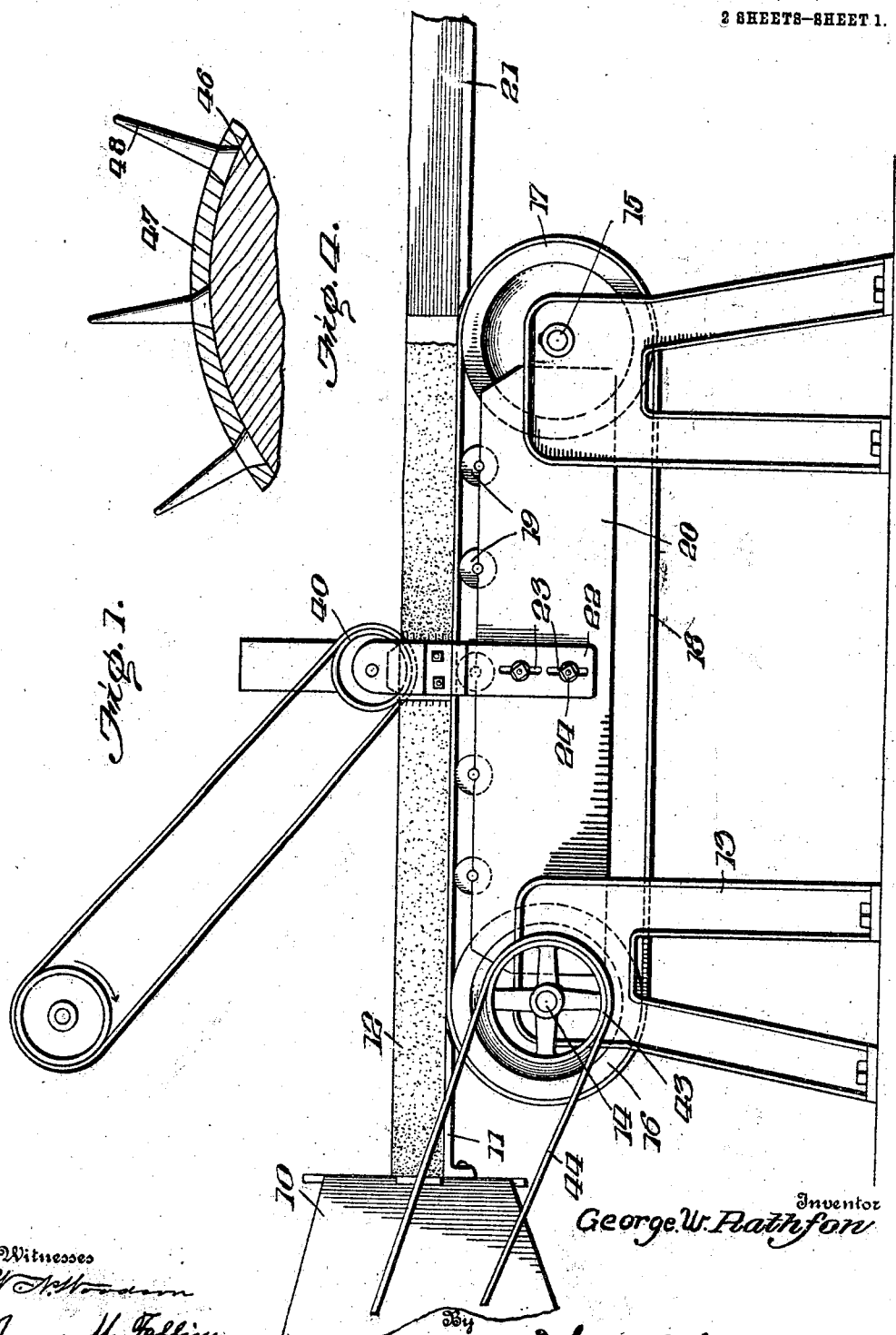
Figure 2:
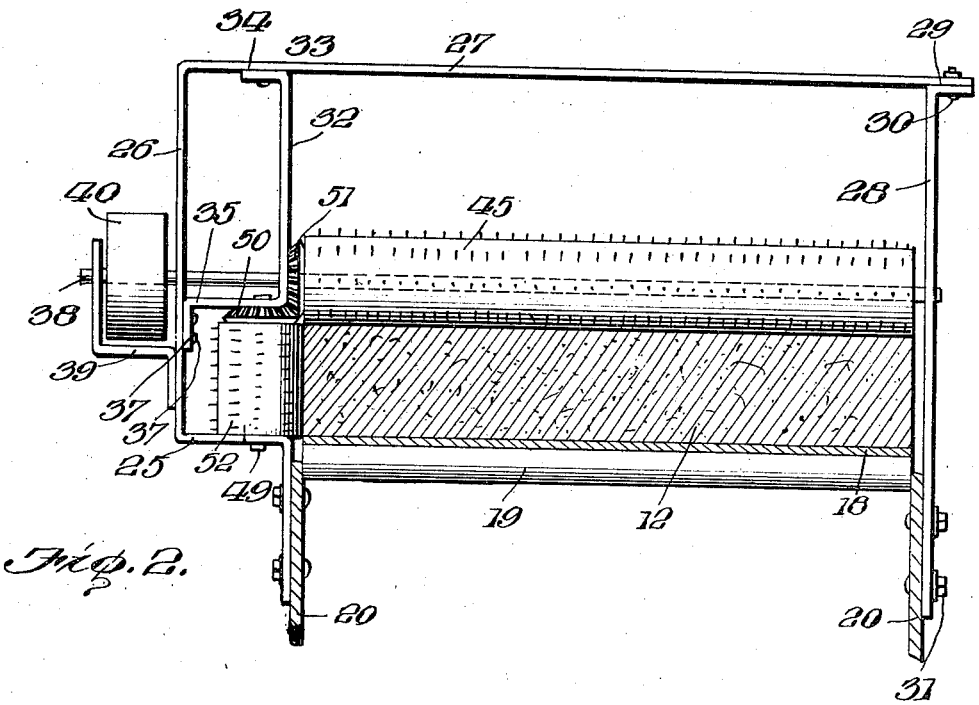
Figure 3:
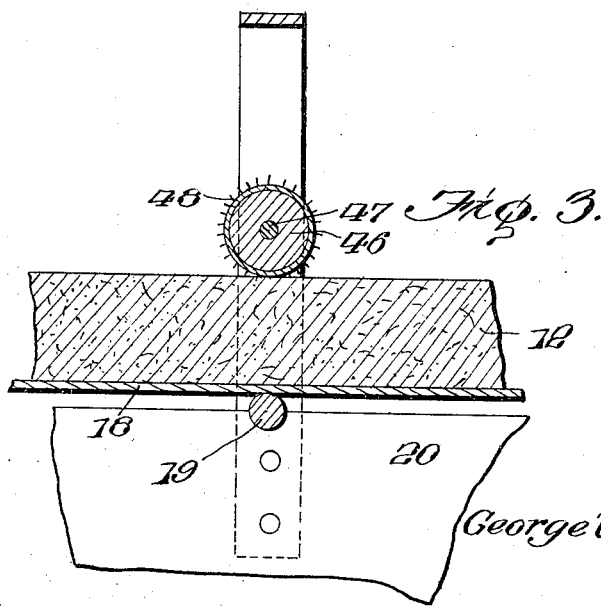

Figure 1 is a side elevation of the carrier of the molding machine with the improved apparatus applied thereto, and discloses a plastic block secured to the same. Fig. 2 is a section on the line 2—2 of Fig. 1. Fig. 3 is a fragmentary view showing the transverse section through the marker and a longitudinal section through the carrier and a plastic block supported thereby, and Fig. 4 is a detailed sectional view of the roller and teeth supported thereon.

Corresponding and like parts are referred to in the following description and indicated in all the views of the drawings by the same reference characters.

Referring to the drawings the numeral 10 designates the delivering end of a mold of any common formation which is provided with an outwardly projected lip 11 for supporting the plastic block 12 which is fed outwardly from the mold 10 and which is engaged over the face of a carrier located adjacent the lip 11. The carrier comprises the studs 13 which are disposed in pairs and are spaced apart from one another in the upper ends of which are journaled transverse shafts 14 and 15 upon which enlarged rollers 16 and 17 are disposed. An endless belt 18 is mounted over the rollers 16 and 17 and is supported at the upper end of the carrier upon a plurality of reduced transverse rollers 19 which are disposed in spaced relation beneath the under surface of the endless belt 18 and journaled at their opposite ends in the side boards 20 longitudinally positioned between the standards 13 and at the opposite sides of the carrier. The endless belt 18 is thereby retained in a substantially horizontal plane upon the upper side of the carrier in order to form a smooth surface for the reception of the plastic block 12. At the opposite end of the carrier a suitable table 21, or the like is positioned to which the plastic block 12 is fed in order to be cut into bricks of the desired size.

The marker which comprises the essential part of this application is formed of a vertical frame which is secured to the sideboards 20 and transversely positioned centrally of the carrier. The frame comprises a shank 22 which is engaged against the outer face of one of the sideboards 20 and which is provided with longitudinal and central slots 23 through which are extended clamping bolts 24 carried by the sideboard 20 in order to admit of the vertical adjustment of the shank 22. The upper end of the shank 22 is bent outwardly at substantially right angles to form a lower horizontal arm 25 which terminates in an offset portion 26 which is vertically disposed and which is curved inwardly at its upper end to form an upper horizontal arm 27, the upper horizontal arm 27 being extended the entire width of the carrier. The opposite end of the arm 27 is supported upon a standard 28 which is flanged at its upper extremity as at 29 to engage beneath the outer end of the arm 27 and to admit of the positioning of a rivet or bolt 30 in order to secure the same rigidly in position. The standard 28 extends downwardly and engages against the opposite side board 20 upon the outer face thereof where it is secured thereto by means of clamping bolts 31 which are engaged through longitudinal and central slots formed in the lower end of the standard 28 the clamping bolts 31 being carried by the side board 20. Disposed beneath the upper horizontal arm is an L-brace 32 which is formed of a metallic strip turned over at its upper end as at 33 to engage against the under face of the horizontal arm 27 and to accommodate the positioning of rivets 34 or the like therethrough for retaining the L-brace 32 in position. The lower end of the L-brace is extended outwardly as at 35 at its lower end to form a journal and is retained rigidly in such position by a downturned portion 36 which is engaged against the inner face of the offset portion 26 and secured thereto by rivets 27 or the like.

Transversely mounted in the frame and journaled at its opposite ends in the standard 28 and lower end of the L-brace 32 is a shaft 38, one extremity of which extends beyond the L-brace 32 and passes outwardly through the offset portion 26 where it is terminated in a bracket 39 which is carried upon the side of the offset portion 26. The shaft 38 is provided with a pulley 40 which is keyed thereto between the offset portion 56 and the bracket 39 and supports a belt 41 carried downwardly to engage about a pulley 42 located upon one side of the carrier upon the shaft 14. The shaft 14 carries a second pulley 43 outwardly of the pulley 42 and upon which is positioned a belt 44 which is connected to a source of power in order to drive a carrier and marking mechanism. Intermediately positioned between the L-brace 32 and the standard 28 is a roller 45 which extends the entire width of the carrier and which is formed of a cylindrical wooden body 46 covered by a casing of metal 47 into which is positioned a plurality of pins or spikes 48. The spikes 48, as is disclosed in Fig. 4, are preferably enlarged at their inner ends and inserted outwardly from the inner side of the shell or casing 47 thereby rigidly holding the pins 48 in position upon the insertion of the cylindrical wooden body portion 46. The roller 45 is rigidly keyed to the shaft 38 and adapted for rotation therewith. A stub-shaft 49 is carried by the frame which is vertically disposed between the lower end of the L-brace 32 and the lower horizontal arm 25, the stub-shaft 49 being provided with a beveled gear 50 at the upper end thereof and meshes with a second beveled gear 51 carried upon the shaft 38 adjacent the L-brace 32 for the purpose of imparting rotation from the shaft 38 to the stub-shaft 49. The stub-shaft 49 carries a roller 52 which is of similar formation to the roller 45 and which is also provided with a plurality of pins 53 to coöperate with the pins 48 of the roller 45 to mark the plastic body 12 which is drawn from the mold 10 and moved across the carrier.

The operation of the marker is as follows:—When the plastic body 12 is emitted from the mold 10 the carrier is set in motion through the medium of the belt 44 and pulley 43, the pulley 43 revolving the shaft 14 which rotates the large roller 16 and moves the endless belt 18, whereby the large roller 17 and the shaft 15 are revolved. This carries the endless belt over the reduced transverse rollers 19 which support the plastic body 12 and carries the same evenly over the upper face of the carrier. Simultaneously with this operation the pulley 42 is rotated to cause the operation of the belt 41 and consequently the rotation of the pulley 40. This motion causes the revolving of the shaft 38 to carry the roller 45 about therewith and to also rotate the stub-shaft 49 and roller 52.

It will be noted from the drawings that the rollers 45 and 52 are of like diameters and also that the beveled gears 50 and 51 are of like size, thereby producing the registering of the two rollers across the top and side of the plastic body 12 as it is fed forwardly over the carrier. The pins 48 and 53 are disposed upon the rollers 45 and 52 in any adapted relation in order to engage in the faces of the plastic block 12 and to form indentations within the same. The clamping bolts 24 and 31 admit of the raising of the entire frame which supports the marking mechanism in order to accommodate plastic bodies of various thicknesses according to the form and size of the mold to which the marker is applied.

The spacing of the rollers 45 from the upper leg of the conveyer 18 prevents the upward movement of the plastic block 12 upon the conveyer. The roller 52 in conjunction with the member 28 at the side of the transverse frame prevents the spreading and lateral movement of the plastic block during its passage through the marker. This arrangement of the frame and the rollers therein, provides a housing which completely incloses the plastic block during its passage through the marker and prevents the deformation of the block under the pressure.

The teeth which are carried in the peripheries of the rollers 45 and 52 serve the double function of not only indenting the surfaces of the block 12 but also assisting in the feeding of the block through the marker.

Having thus described the invention what is claimed as new is:—

1. A marker including a frame, a horizontal shaft mounted intermediately in said frame, a vertical shaft journaled in one side of the said frame, beveled gears carried by the adjacent ends of said shafts and intermeshed, rollers located upon said shafts, pluralities of pins radially extended from the peripheries of said rollers, said horizontal shaft being extended outwardly from one side of said frame, a bracket disposed upon the side of said frame and engaged with the outer end of said shaft and a pulley located in the outer end of said shaft between said frame and said bracket.

2. In a marker the combination with a carrier having sideboards upon the same of a standard engaged on one of said sideboards, a shank positioned upon the opposite of said sideboards in registered relation to said standard, a horizontal arm outwardly extended from the upper end of said shaft, an offset portion vertically disposed upon the outer end of said horizontal arm, an upper horizontal arm inwardly extended from the upper extremity of said offset portion, the opposite end of said upper horizontal arm being engaged with the upper end of said standard, an L-brace located between said upper horizontal arm and said offset portion, a horizontal roller located between said L-brace and said standard, a vertically disposed roller located between said L-brace and the lower horizontal arm, and means carried by the marker for actuating said rollers.

In testimony whereof I affix my signature in presence of two witnesses.

GEORGE W. RATHFON. [L. S.]

Witnesses:
    IVAN HUFFMAN,
    ADDIE ILES.